(12) United States Patent
Takematsu et al.

(10) Patent No.: US 6,207,263 B1
(45) Date of Patent: Mar. 27, 2001

(54) ANTI-REFLECTION FILM AND PROCESS FOR PREPARATION THEREOF

(75) Inventors: Kiyotaka Takematsu; Hiroomi Katagiri, both of Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/007,796

(22) Filed: Jan. 15, 1998

(30) Foreign Application Priority Data

Jan. 20, 1997 (JP) .................................................... 9-019562

(51) Int. Cl.[7] ........................................................ B32B 7/02
(52) U.S. Cl. ............................ 428/220; 428/213; 428/142
(58) Field of Search .................................... 428/141, 142, 428/213, 220

Primary Examiner—Merrick Dixon
(74) Attorney, Agent, or Firm—Parkhurst & Wendel, LLP

(57) ABSTRACT

This invention provides an anti-reflection film for use in various displays which prevents the reflection of light on the surface and enables necessary visual information to be clearly discerned. The anti-reflection film has a hard coat layer 4, an intermediate refractive index layer 3, a high refractive index layer 2 and a low refractive index layer 1 formed in this sequence on a transparent base film 5, such that the refractive indices of the adjacent layers satisfy the relationship 2.20>refractive index of the high refractive index layer>refractive index of the intermediate refractive index layer>refractive index of the low refractive index layer >1.40.

9 Claims, 6 Drawing Sheets

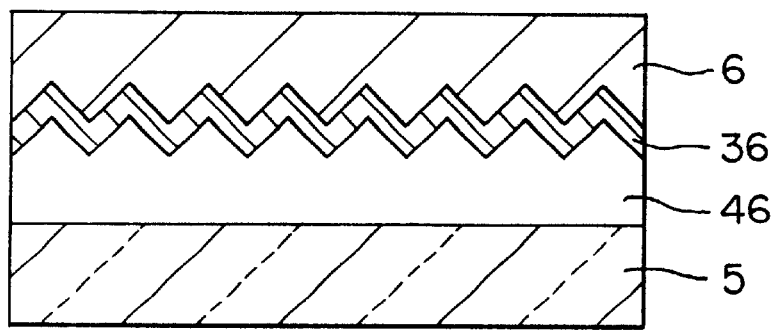
F I G. 4A
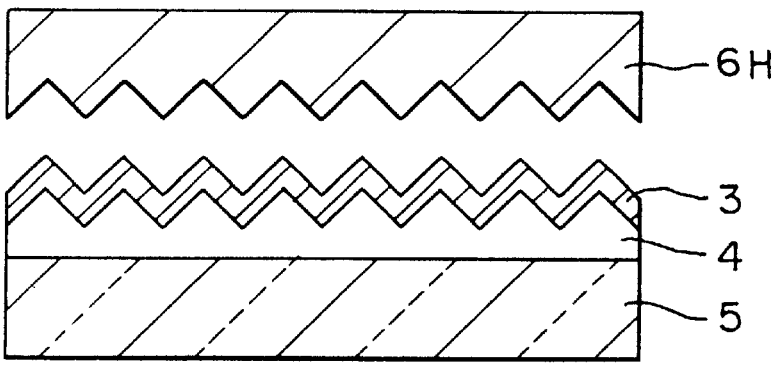
F I G. 4B
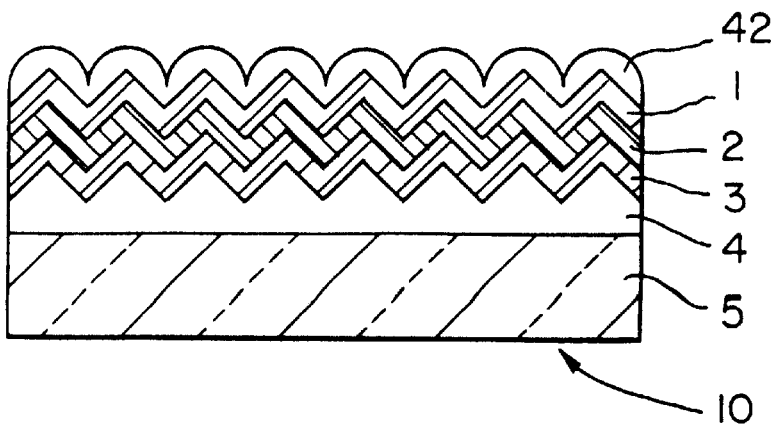
F I G. 4C

ANTI-REFLECTION FILM AND PROCESS FOR PREPARATION THEREOF

BACKGROUND OF THE INVENTION

The present invention relates to a film having optical functions such as anti-glare properties. More specifically, the invention relates to a film with excellent optical characteristics which is suitable as an anti-reflection film on the surface of various displays of word processors, computers and TV sets, polarizing plates for use in liquid crystal display devices, lenses of sunglasses composed of transparent plastics, lenses of vision-correcting eyeglasses, optical lenses such as camera finder lenses, covers for various gauges, and window glasses of automobiles and electric trains.

Transparent base plates of glass, plastic or the like are used for displays of curve mirrors, rear view mirrors, goggles, window glasses, displays for personal computers and word processors, and various other displays for commercial use. One may see objects or recognizes visual information, such as characters or graphics, through these transparent base plates, or may observe images from a reflection layer through the transparent base plate of the mirror. In so doing, one may feel it difficult to discern the necessary visual information located in the transparent base plate, because the surface of the transparent base plate reflects light.

Techniques for preventing the reflection of light include a method of coating an anti-reflection coating on the surface of a glass or plastic material, a method of providing a super thin film of $MgF_2$ or the like or a vacuum deposited metal film about 0.1 $\mu$m thick on the surface of a transparent base plate of glass or the like, a method of coating an ionizing radiation curing resin on the surface of a plastic lens and forming a film of $SiO_x$ or $MgF_2$ on the coating by vacuum deposition, and a method of further forming a coating with a low refractive index on a cured film of an ionizing radiation curing resin.

The above-mentioned thin film of $MgF_2$ about 0.1 $\mu$m thick formed on glass will be described in further detail. This thin film as an anti-reflection film is required to prevent reflection of light completely and allow 100% transmission of light when incident light falls vertically on the thin film in the air. With a specific wavelength designated as $\lambda_0$, the refractive index of the anti-reflection film for this wavelength as $n_0$, the thickness of the anti-reflection film as h, and the refractive index of the base plate as $n_2$, the relations of the following Equations 1 and 2 must hold to fulfill the above requirements, as have been already known (Science Library, Physics=9 "Optics", pp. 70–72, 1980, Science Ltd.):

$$n_0 = (n_2)^{1/2} \quad \text{(Equation 1)}$$

$$n_0 h = \lambda_0/4 \quad \text{(Equation 2)}$$

The refractive index of glass $n_2=1.5$, the refractive index of $MgF_2 n_0 = 1.38$, and the wavelength of incident light $\lambda_0 = 5500$ Å (reference) are known. Substituting these values into Equation 2 yields about 0.1 $\mu$m as the optimal thickness h of the anti-reflection film.

Equation 1 tells that an effective way of preventing reflection of light 100% is to select a material in which the refractive index of a coating on the upper layer side is close to the square root of the refractive index of the lower layer laid under the coating.

DISCLOSURE OF THE INVENTION

An object of the present invention is to provide an anti-reflection film for use in a display in which the surface of a transparent base plate prevents the reflection of light and transmits necessary visual information inside the transparent base plate, and enables an observer to clearly discern the visual information, when seeing objects or visual information, such as characters or graphics, through the transparent base plate, or observing an image from a reflection layer through the transparent base plate of a mirror.

The invention for attaining this object, as shown in FIG. 1 or 2, resides in an anti-reflection film 10 having an intermediate refractive index layer 3, a high refractive index layer 2 and a low refractive index layer 1 formed in this sequence on a transparent base film 5 via a hard coat layer 4, the anti-reflection film 10 comprising:

the low refractive index layer 1 comprising an $SiO_x$ layer;

the intermediate refractive index layer 3 constituted by a coating of a composition comprising a binder and ultrafine particles having a refractive index of 1.5 or more; and the high refractive index layer 2 having electric conductivity; and the anti-reflection film 10 having:

the relationship: 2.20>refractive index of the high refractive index layer>refractive index of the intermediate refractive index layer>refractive index of the low refractive index layer>1.40;

the thickness of each refractive index layer being 80 to 110 nm for the low refractive index layer, 30 to 110 nm for the high refractive index layer, and 50 to 100 nm for the intermediate refractive index layer; and an optical film thickness D not larger than the wavelength of visible light (D=n·d where n is the refractive index of the intermediate refractive index layer and d is the thickness of the intermediate refractive index layer).

In the present invention, it is preferred that the anti-reflection film 10 is such that the hard coat layer 4 has irregularities on its surface in contact with the intermediate refractive index layer 3, and the hard coat layer 4 is provided on the transparent base film 5 directly or via a primer layer 7 and/or an adhesive layer 9, as illustrated in FIG. 6.

Preferably, the anti-reflection film 10 is such that the intermediate refractive index layer is composed of 0.1 to 20 parts by weight of a mat material based on one part by weight of a thermosetting resin and/or an ionizing radiation curing resin, the mat material being selected from fine particles of one or more kinds selected from the group consisting of ultrafine particles of ZnO, $TiO_2$, $CeO_2$, $Sb_2O_5$, $SnO_2$, ITO, $Y_2O_3$, $La_2O_3$, $Al_2O_3$, $Hf_2O_3$ and $ZrO_2$.

Preferably, the anti-reflection film 10 is such that the high refractive index layer and the low refractive index layer are each a layer provided by vacuum coating.

Preferably, the anti-reflection film 10 is such that the low refractive index layer is formed by plasma CVD involving the discharge of the starting gas of an organosiloxane, and the undecomposed organosiloxane remains in an amount of 0.1 to 0.2 part based on the $SiO_x$.

Furthermore, an antifouling layer may be formed on the low refractive index layer.

A first process for preparation of the anti-reflection film of the present invention is as follows:

As shown in FIG. 3, an uncured hard coat layer 46 of the curing reaction type is provided on a transparent base film 5. Then, an uncured intermediate refractive index layer 36 comprising a composition containing a binder and fine particles having a higher refractive index than the refractive index of the binder is coated on the transparent base film.

A laminate having a finely irregular, matted shaped film 6 laminated and shaped on the uncured hard coat layer and intermediate refractive index layer (see FIG. 3A) is heat-treated and/or ionizing radiation treated to cure the hard coat layer and intermediate refractive index layer.

From the cured laminate, the shaped film 6H is stripped off to form an intermediate refractive index layer 3 having irregularities on the surface of a hard coat layer 4 as illustrated in FIG. 3B.

On the cured intermediate refractive index layer 3 having irregularities, a high refractive index layer 2 is formed by vacuum deposition or sputtering. Further, a low refractive index layer 1 comprising an $SiO_x$ layer is formed by vacuum deposition, sputtering or plasma CVD to constitute an anti-reflection film 10. This is shown in FIG. 3C.

A second process for preparation of the anti-reflection film of the invention is as follows:

A matted shaped film 6 having irregularities on the surface is coated with an uncured intermediate refractive index layer 36 comprising a composition containing a binder and fine particles having a higher refractive index than the refractive index of the binder. To the uncured intermediate refractive index layer, an uncured hard coat layer 46 provided on a transparent base film 5 is laminated as shown in FIG. 4A.

The resulting laminate is heat-treated and/or ionizing radiation treated to cure the intermediate refractive index layer and hard coat layer. From the cured laminate, the shaped film 6H is stripped off to form an intermediate refractive index layer 3 having irregularities on the surface of a hard coat layer 4 (see FIG. 4B).

Then, as shown in FIG. 4C, a high refractive index layer 2 and a low refractive index layer 1 are laminated and formed in the same manner as in the first preparation process. If desired, an antifouling coat layer 42 may be formed on the low refractive index layer.

A third process for preparation of the anti-reflection film of the invention is as follows:

As shown in FIG. 5A, a shaped film 6 is coated with an uncured intermediate refractive index layer containing a binder and fine particles having a higher refractive index than the refractive index of the binder, and an uncured hard coat layer. Then, the uncured layers are cured.

Separately, a transparent base film is coated with a reactive adhesive layer 9. On the uncured surface of the reactive adhesive layer 9, the cured intermediate refractive index layer is laminated. The resulting laminate is heat-treated and/or ionizing radiation treated to cure the adhesive layer to prepare a laminate as shown in FIG. 5B.

From the cured laminate, the shaped film 6H is stripped off to form an intermediate refractive index layer 3 on a transparent base film 5 via the adhesive layer 9 and the hard coat layer 4.

Then, as shown in FIG. 5C, a high refractive index layer 2 and a low refractive index layer 1 are laminated in the same manner as in the first preparation process to constitute an anti-reflection film 10.

BRIEF DESCRIPTION OF THE DRAWINGS

FIGS. 4A, 4B and 4C are sectional schematic views showing the steps of the second process for preparation according to the present invention;

BEST MODE FOR CARRYING OUT THE INVENTION

Preferred embodiments of the present invention will now be described with reference to the accompanying drawings.

Figure 1:
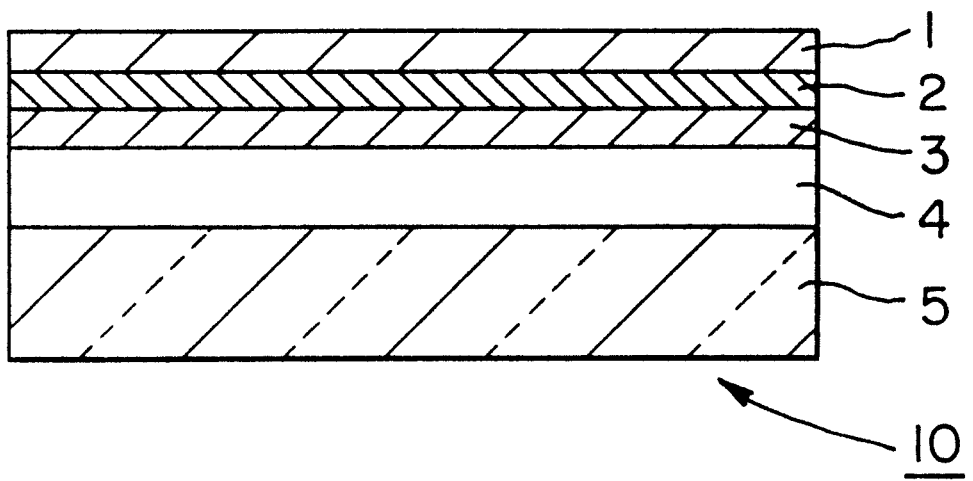
FIG. 1 is a sectional view showing the basic layered structure of the anti-reflection film of the present invention.
Figure 2:
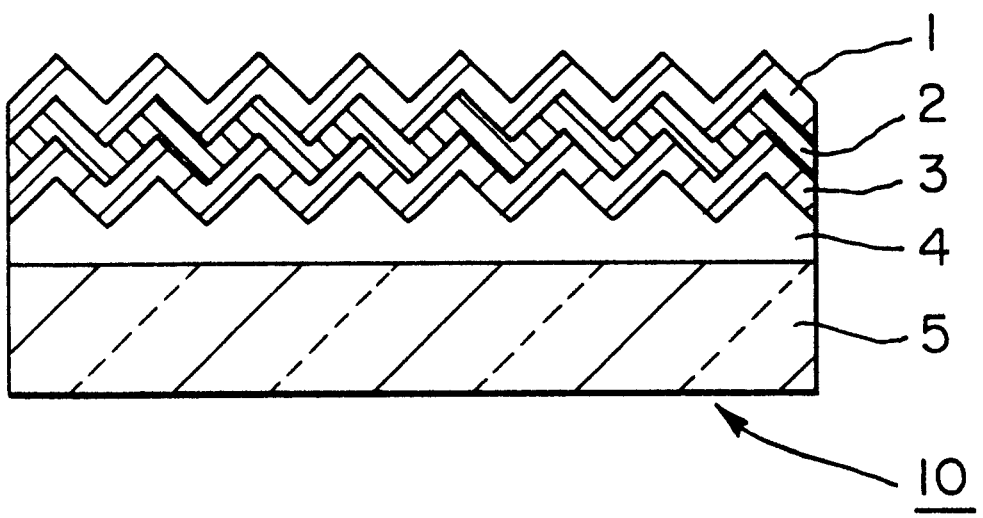
FIG. 2 is a sectional view showing a constitution in which an intermediate refractive index layer having irregularities is added to the anti-reflection film of the present invention.

As shown in FIG. 1 or 2, an anti-reflection film 10 of the present invention has an intermediate refractive index layer (first layer) 3, a high refractive index layer (second layer) 2 and a low refractive index layer (third layer) 1 formed in this sequence on one surface of a transparent base film 5 via a hard coat layer 4 in a mirror shape or given irregularities.

The anti-reflection film 10 is constituted such that the low refractive index layer 1 comprises an $SiO_x$ layer;

the intermediate refractive index layer 3 is constituted on a hard coat layer 4 with irregularities by coating a paint comprising a binder and ultrafine particles having a refractive index of 1.5 or more; and the high refractive index layer 2 has electric conductivity and electromagnetic shielding properties;

the refractive indices of the adjacent refractive index layers of the respective layers satisfy the relationship: 2.20>refractive index of the high refractive index layer>refractive index of the intermediate refractive index layer (or the intermediate refractive index layer having irregularities)>refractive index of the low refractive index layer>1.40;

the thicknesses of the respective refractive index layers are 80 to 110 nm for the low refractive index layer 1, to 110 nm for the high refractive index layer 2, and 50 to 100 nm for the intermediate refractive index layer 3; and an optical film thickness D calculated from the equation D=n·d (wherein n=refractive index of the intermediate refractive index layer, and d=thickness of the intermediate refractive index layer) is not larger than the wavelength of visible light.

Figure 5A:
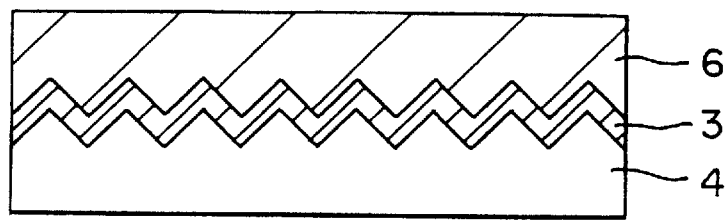
FIGS. 5A, 5B and 5C are sectional schematic views showing the steps of the third process for preparation according to the present invention.
Figure 5B:
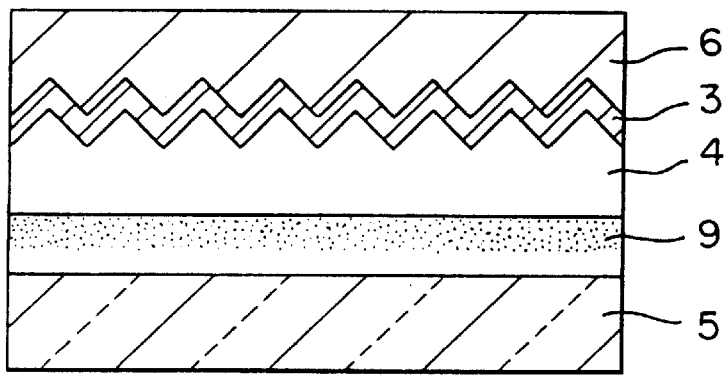
Figure 5C:
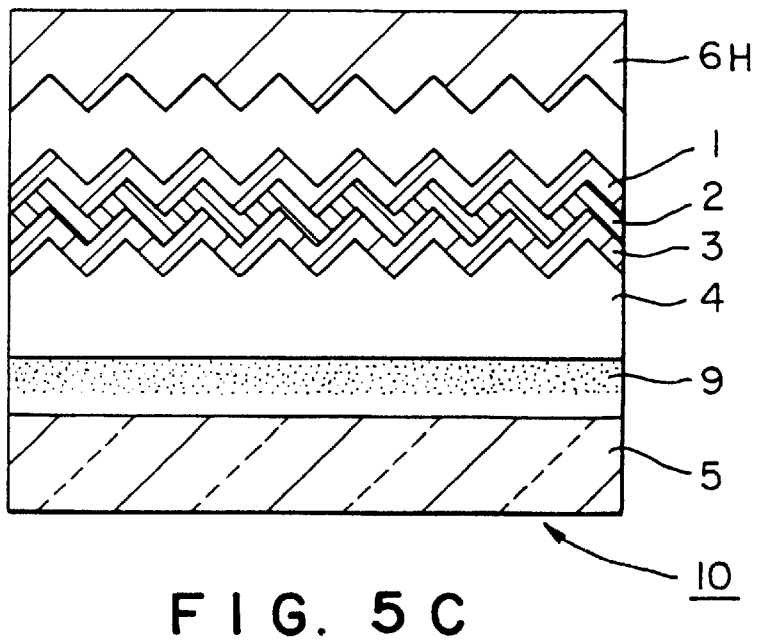
Figure 6:
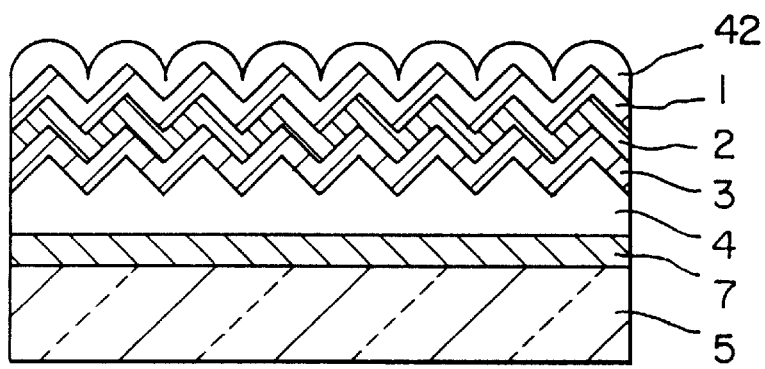
FIG. 6 is a sectional schematic view showing another constitution of the present invention.

Preferably, the anti-reflection film 10 is such that the hard coat layer 4 has irregularities on its surface in contact with the intermediate refractive index layer 3, and the hard coat layer 4 is provided on the transparent base film 5 directly or via a primer layer 7 as shown in FIG. 6, or via an adhesive layer 9 as shown in FIG. 5, and the low refractive index layer 1 is provided with an antifouling layer 42.

Preferably, the anti-reflection film 10 is such that the intermediate refractive index layer 3 is composed of 0.1 to 20 parts by weight of a mat material based on one part by weight of a thermosetting resin and/or an ionizing radiation curing resin, the mat material being selected from fine particles of one or more kinds selected from the group consisting of ultrafine particles of ZnO (refractive index 1.90; the values indicated below represent refractive indices), $TiO_2$ (2.3–2.7), $CeO_2$ (1.95), $Sb_2O_5$ (1.71), ITO (1.95), $Y_2O_3$ (1.87), $La_2O_3$ (1.95), $ZrO_2$ (2.05), and $Al_2O_3$ (1.95), $Zro_2$ (2.05), and $Al_2O_3$ (1.63). The ultrafine particles preferably have a higher refractive index than that of the binder of the intermediate refractive index layer, and have a refractive index of 1.5 or more. The average particle size of the ultrafine particles is preferably 5 to 50 nm, and more preferably 5 to 10 nm.

Preferably, the high refractive index layer 2 and the low refractive index layer 1 are each a layer provided by vacuum coating.

Preferably, the low refractive index layer 1 is formed by plasma CVD involving the discharge of the starting gas of an organosiloxane, and the undecomposed organosiloxane remains in the $SiO_x$ layer.

Furthermore, an antifouling layer 42 as shown in FIG. 6 may be formed on the low refractive index layer 1.

The transparent base sheet of the present invention is formed from a ceramic material such as glass, or a transparent stretched or unstretched plastic film.

Besides ordinary optical glass, thermoplastic resins can be used, such as polyester, polyamide, polyimide, polypropylene, polymethylpentene, polyvinyl chloride, polyvinyl acetal, polymethyl methacrylate, polycarbonate, and polyurethane.

On the transparent base film, a hard coat layer having tiny irregularities may be provided directly or through a primer layer for making the adhesion of the hard coat layer firm. On the hard coat layer, an intermediate refractive index layer 3 as shown in FIG. 2 may be provided, and other refractive index layer may be further provided.

The intermediate refractive index layer 3 is lower in refractive index than the high refractive index layer 2, and higher in refractive index than the low refractive index layer 1, hard coat layer 4 and/or transparent base film 5.

The intermediate refractive index layer 3 is preferably provided on the base film 5 by coating a composition comprising a binder and ultrafine particles of a metal oxide as a mat material selected from fine particles of one or more kinds selected from the group consisting of ZnO, $TiO_2$, $CeO_2$ (refractive index 1.95), $Sb_2O_5$, $SnO_2$, ITO, $Y_2O_3$, $La_2O_3$, $ZrO_2$ (refractive index 2.05), $Al_2O_3$ and $Hf_2O_3$.

Figure 3A:
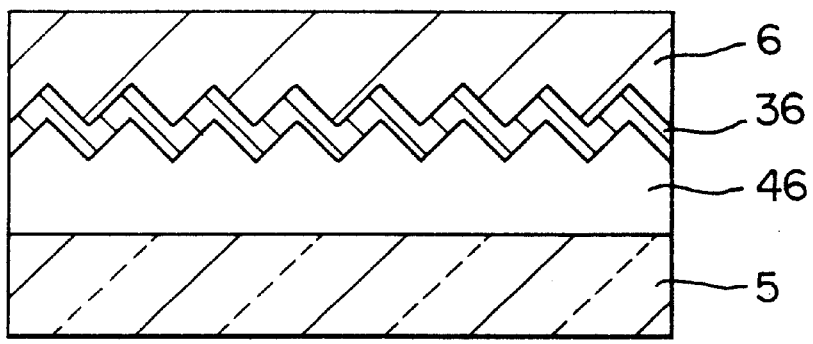
FIGS. 3A, 3B and 3C are sectional schematic views showing the steps of the first process for preparation according to the present invention.
Figure 3B:
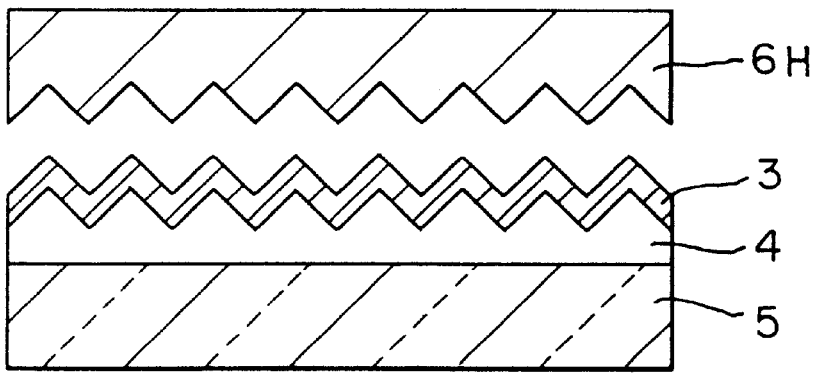
Figure 3C:
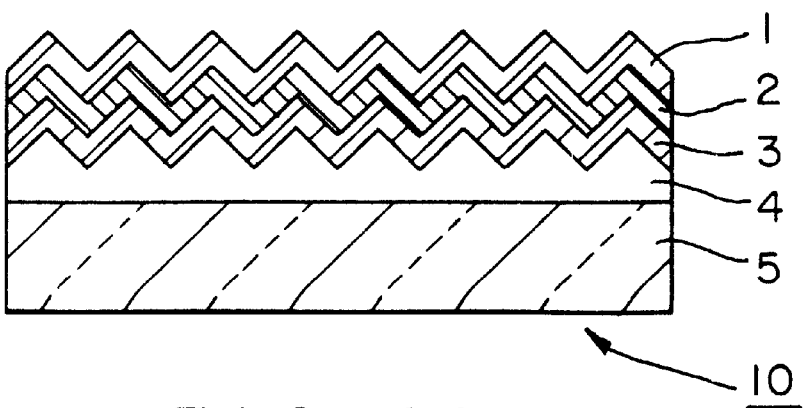

The intermediate refractive index layer 3 is formed, as shown in FIG. 3, by coating an uncured hard coat layer 46 on the transparent base film 5, further coating an uncured intermediate refractive index layer 36, laminating these uncured layers to a shaped film 6, heating and/or ionizing radiating treating the laminate to cure the layers, and stripping the shaped film 6 off.

Furthermore, as shown in FIG. 4, the intermediate refractive index layer 3 can be constituted by a transfer method which comprises providing an uncured intermediate refractive index layer 36 and an uncured hard coat layer 46 on a shaped film 6 having irregularities, providing an adhesive layer 9, if desired, on the transparent base film, laminating these layers together, and curing and shaping the laminate.

The ratio of the ultrafine particles to the binder (weight ratio) in the intermediate refractive index layer is preferably 1–20 (ultrafine particles): 1 (binder). If this ratio is less than 1: 1, the effect of anti-reflection decreases. At a ratio of more than 20:1, the adhesion of the ultrafine particles declines, and the ultrafine particles increasingly tend to fall off.

The irregularities for providing the intermediate refractive index layer of the invention may be provided for the shaped hard coat layer 4, but the same function may be imparted by shaping the adhesive layer 9 or primer layer 7, the layer on the transparent base film, into an irregular form. The irregularities of the hard coat layer 4 are in direct contact with the intermediate refractive index layer 3, and the refractive index of the hard coat layer 4 is smaller than the refractive index of the intermediate refractive index layer 3.

The reactive resin that satisfies the foregoing requirements and serves to form the intermediate refractive index layer or the hard coat layer preferably includes, for example, those containing a relatively large amount of a compound having an acrylate type functional group, such as relatively low molecular weight polyester, polyether, acrylic resin, epoxy resin, polyurethane, alkyd resin, spiroacetal resin, polybutadiene, polythiolpolyene resin, an oligomer or prepolymer of (meth)acrylate (in this specification, acrylate and methacrylate are collectively expressed as (meth)acrylate) of a polyfunctional compound such as polyhydric alcohol, and a monofunctional monomer such as ethyl (meth) acrylate, ethylhexyl (meth)acrylate, styrene, vinyltoluene or N-vinylpyrrolidone which is a reactive diluent, and a multifunctional monomer such as trimethylolpropane tri(meth) acrylate, hexanediol (meth)acrylate, tripropylene glycol di(meth)acrylate, diethylene glycol di(meth)acrylate, pentaerythritol tri(meth)acrylate, dipentaerythritol hexa(meth) acrylate, 1,6-hexanediol di(meth)acrylate, or neopentyl glycol di(meth)acrylate.

When the ionizing radiation curing resin is used as an ultraviolet curing resin, it is preferred to incorporate therein a photopolymerization initiator such as acetophenone, benzophenone, Michler's benzoyl benzoate, α-amyloxime ester, or thioxanthone, and a photosensitizer such as n-butylamine, triethylamine, or tri-n-butylphosphine.

The ionizing radiation curing resin may further contain the following reactive organosilicon compound:

A compound of the formula $R_mSi(OR')_n$ where R and R' each denote an alkyl group having 1 to 10 carbon atoms, m+n=4, and m and n each denote an integer. Examples of the compound are tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltrimethoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane, and hexyltrimethoxysilane.

The thickness of the hard coat layer 4 is preferably 0.5 to 6 μm, more preferably 3 μm or more. If the thickness is less than 0.5 μm, it cannot maintain the hardness of the intermediate refractive index layer, the high refractive index layer and the low refractive index layer formed on the transparent base film. If its thickness is more than 3 μm, satisfactory hardness can be maintained, and hardness performance can be imparted to the anti-reflection film.

Making the hard coat layer thicker than required would impair the flexibility of the anti-reflection film, and take time for curing, imposing restrictions on the productivity and cost.

The term "hardness performance" or "hard coat" as used herein refers to hardness of the grade H or higher according to the pencil hardness test described in JISK5400.

The material for use in the high refractive index layer 2 of the invention should desirably be one higher in refractive index than the binder in the intermediate refractive index layer, and having a refractive index of 1.5 or more. This material may be the same as the fine particle material used in the intermediate refractive index layer.

One or more materials selected from the above-described compounds are used to form the high refractive index layer by vacuum deposition or sputtering. The high refractive index layer is given the highest refractive index of the refractive indices of the respective layers of the invention so that the thickness d of the intermediate refractive index layer will be 80 to 110 nm, and its refractive index will be 1.90 to 2.10. The product of the refractive index n and the thickness d (i.e., the optical thickness D) is adjusted to not larger than the wavelength of visible light so that the reflection of light can be prevented and the transmission of visible light can be optimized.

The high refractive index layer is preferably composed of a sputter film of ITO, and its surface resistance is desirably $10^3$ Ω/□ or less.

In this case, the binder of the intermediate refractive index layer is preferably formed of a thermosetting and/or ionizing radiation curing organosilicon compound. Thus, the adhesion of the intermediate refractive index layer to the above-mentioned ITO layer can be increased further.

The ultrafine particles of the intermediate refractive index layer, particularly preferably, comprise $ZrO_2$ particles to impart better durability.

The low refractive index layer of the invention comprises $SiO_x$ (x=1.5–4.0), and can be formed by CVD, or preferably by plasma CVD using an organosiloxane as the starting gas under conditions under which no other inorganic vacuum deposition source exists. The vacuum deposited film is maintained at as low a temperature as possible.

The $SiO_x$ layer (low refractive index layer) of the invention is adapted to contain the undecomposed organosiloxane and to have carbon remaining at a ratio of 0.1–0.2 to silicon. Thus, the effect of maintaining the flexibility and adhesion of $SiO_x$ can be enhanced further.

The thus formed low refractive index layer comprises the $SiO_x$ layer with a contact angle of the surface to water of from 40 to 180 degrees. Hence, this layer is also effective in preventing the deposition of dust.

A polarizing plate having the so constituted anti-reflection film 10 laminated on a polarizer, or a cathode-ray tube with the anti-reflection film 10 bonded onto the surface gives a sharp image and is reflection-free.

A liquid crystal display device with the polarizing plate built-in shows a sharp image free from reflected light.

The present invention will now be described in more detail by reference to Examples.

EXAMPLE 1

On one surface of a 50 μm thick biaxially stretched polyethylene terephthalate film (Lumirror T-60#50, TORAY INDUSTRIES, INC.) as a shaped film 6 as shown in FIG. 4, $ZrO_2$ fine particle coating solution No. 1275 [a coating solution comprising 0.3 part by weight of a binder (an ionizing radiation curing organosilicon compound) per 100 parts by weight of $ZrO_2$ fine particles; Sumitomo Osaka Cement Co., Ltd.] was coated to a thickness of 57 nm (dry thickness; the same holds in the following description) by means of a wire bar to form an uncured intermediate refractive index layer 36 (refractive index 1.74).

Separately, an ultraviolet curing resin (PET-D31, DAINICHISEIKA COLOUR & CHEMICALS MFG. CO., LTD.) was coated on a 188 μm thick PET film (A-4350#188, TOYOBO, CO., LTD.) as a transparent base film 5 to a thickness of 6 μm, followed by drying the solvent component, to form an uncured hard coat layer 46.

Then, the uncured intermediate refractive index layer 36 provided on the shaped film 6, and the uncured hard coat layer 46 provided on the transparent base film 5 were laminated and pressure-bonded together in contact with each other. Then, the laminate was irradiated with ultraviolet rays at a dose of 480 mJ (10 m/min) to cure the uncured intermediate refractive index layer 36 and hard coat layer 46 to form an intermediate refractive index layer 3 and a hard coat layer 4. Then, the shaped film 6 was peeled off.

As shown in FIG. 4B, the transparent base film 5 cleared of the peeled shaped film 6H had the hard coat layer 4 and the intermediate refractive index layer 3 superimposed thereon with the fine particles of the intermediate refractive index layer 3 embedded in and transferred to the surface of the hard coat layer 4.

Further, as shown in FIG. 4C, ITO sputtering (refractive index 2.0) was performed on the side of the intermediate refractive index layer 3 under the conditions, a vacuum of $5 \times 10^{-6}$ torr, a base plate temperature of room temperature, argon of 100 scc/min, oxygen of 5 scc/min, and a deposit rate of 1.6 Å/s, to form a high refractive index layer 2 with a thickness of 105 nm.

On the high refractive index layer 2, $SiO_2$ (refractive index 1.46) was vacuum deposited under the conditions, a vacuum of $5 \times 10^{-6}$ torr, a base plate temperature of room temperature, and a deposit rate of 26 Å/s, to form a low refractive index layer 1 with a thickness of 85 nm.

On the low refractive index layer 1 side, fluorine surfactant FC-772 (a product of 3M) was further coated to a thickness of 2 nm by means of a wire bar to complete an anti-reflection film 10 of Example 1.

EXAMPLE 2

On one surface of MC-19 (a product of Reiko Co., Ltd.) as a 50 μm thick shaped film 6 surface treated with acrylic melamine resin, as shown in FIG. 5, $ZrO_2$ fine particle coating solution No. 1221 [a coating solution comprising 0.3 part by weight of a binder (an ionizing radiation curing organosilicon compound) per 100 parts by weight of $ZrO_2$ fine particles; Sumitomo Osaka Cement Co., Ltd.] was coated to a thickness of 57 nm by means of a wire bar to form an uncured intermediate refractive index layer 36 (refractive index 1.74).

On the intermediate refractive index layer 36 side, an ultraviolet curing resin (PET-D31, DAINICHISEIKA COLOUR & CHEMICALS MFG. CO., LTD.) was coated to a thickness of 8 μm, followed by drying the solvent component, to form an uncured hard coat layer 46.

Then, the uncured intermediate refractive index layer 36 and the uncured hard coat layer 46 were irradiated with ultraviolet rays at a dose of 480 mJ (10 m/min) to cure the uncured intermediate refractive index layer and hard coat layer to provide an intermediate refractive index layer 3 and a hard coat layer 4 on the shaped film 6.

As a result, the fine particles of the intermediate refractive index layer 3 were embedded in and transferred to the surface of the transparent cured resin layer 4, and the hard coat layer 4 and the intermediate refractive index layer 3 were superimposed on the transparent shaped film 6.

On the hard coat layer 4 side, a urethane-derived two-component setting adhesive LX-660/KW75=4/1 (a product of DIC) was coated to a thickness of 10 μm by wire bar coating to form an uncured adhesive layer 43. On the layer 43, a triacetyl cellulose film FT-UV80 (a product of Fuji Photo Film Co., Ltd.) was superimposed as a transparent base film 5. The laminate was aged for 7 days at 40° C. to complete the curing of the adhesive, forming a transparent cured adhesive layer 9, followed by stripping off the shaped film 6H. On the surface of the intermediate refractive index layer 3 deprived of the peeled shaped film 6H, ITO sputtering was performed under the same conditions as in Example 1 to form a high refractive index layer 2. $SiO_2$ was further superimposed on the high refractive index layer 2 by plasma CVD to complete an anti-reflection film 10 of Example 2.

EXAMPLE 3

On one surface of a 188 μm thick biaxially stretched polyethylene terephthalate film T-PET (A-4350, TOYOBO CO., LTD.) as a transparent base film 5 as shown in FIG. 3, the same uncured hard coat layer 46 as used in Example 1 was applied to a thickness of 8 μm. Also, a coating solution comprising 0.4 part by weight of a binder per 100 parts by weight of $TiO_2$ fine particles (the coating solution produced by Sumitomo Osaka Cement Co., Ltd.] was coated to a thickness of 57 nm by means of a wire bar to form an uncured intermediate refractive index layer 36 (refractive index 1.74).

On the surface of the uncured intermediate refractive index layer 36, the same shaped film 6 as used in Example 1 was superimposed, following by curing the laminate.

Thus, a hard coat layer 4 and an intermediate refractive index layer 3 having irregularities were formed in the same manner as in Example 1, followed by stripping off a strippable shaped film 6H.

On the side of the intermediate refractive index layer 3, a 105 nm thick, high refractive index layer 2 by ITO sputtering (refractive index 2.0), and a 85 nm thick, low refractive index layer 1 of $SiO_2$ (refractive index 1.46) were formed.

On the low refractive index layer 1 side, the same fluorine surfactant FC-772 as used in Example 1 was further coated to a thickness of 2 nm to complete an anti-reflection film 10 of Example 3 that used $TiO_2$ instead of $ZrO_2$ in Example 1.

Comparative Example 1

Figure 7:
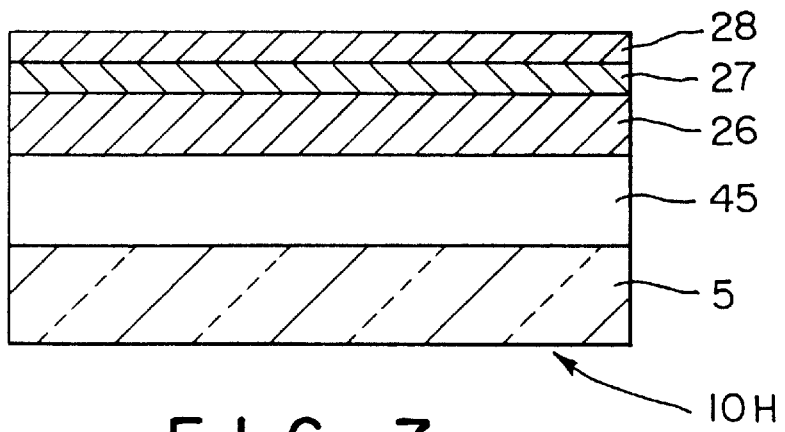
FIG. 7 is a sectional schematic view showing the constitution of a Comparative Example.

As shown in FIG. 7, a hard coat layer 45 with a thickness of 8 μm was provided on a 188 μm thick PET film (A-4350#188, TOYOBO, CO., LTD.) as a transparent base film 5. Further, MgO (refractive index 1.72) was vacuum deposited to a thickness of 57 nm to provide a refracting layer 26. Then, a refracting layer 27 by ITO sputtering and a refracting layer 28 by vacuum deposition of $SiO_2$ were provided in the same manner as in Example 1 to complete an anti-reflection film 10H of a Comparative Example.

Comparative Example 2

An anti-reflection film of Comparative Example 2 was prepared in the same manner as in Comparative Example 1, except that the second refracting layer was formed by vacuum deposition of $TiO_2$ instead of ITO sputtering.

A hard coat layer 45 with a thickness of 8 μm was provided on one surface of a base film 5. Further, MgO (refractive index 1.72) was vacuum deposited to a thickness of 57 nm to provide a refracting layer 26. Then, a highly refracting layer 27 (film thickness 100 nm) by vacuum deposition of $TiO_2$, and a refracting layer 28 (film thickness 85 nm) by vacuum deposition of $SiO_2$ were provided to complete an anti-reflection film 10H of a Comparative Example.

Comparative Example 3

Figure 8:
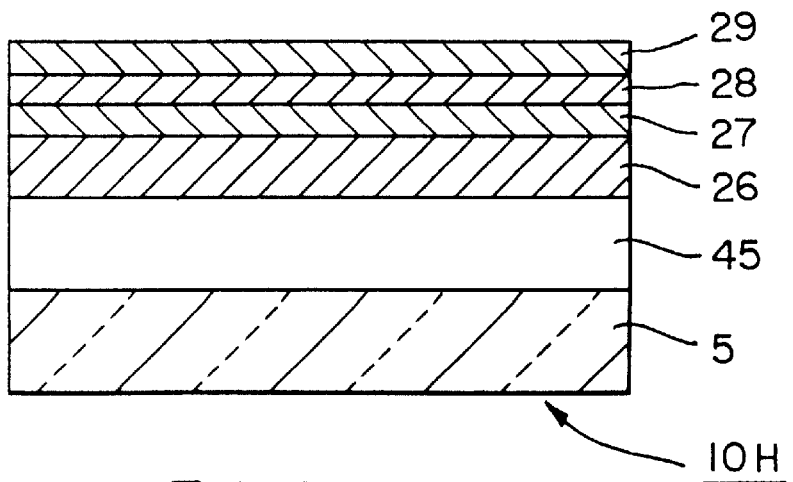
FIG. 8 is a sectional schematic view showing the constitution of another Comparative Example.

As shown in FIG. 8, a hard coat layer 45 with a thickness of 8 μm was provided on a transparent base film 5 in the same manner as in Comparative Example 1.

Further, ITO sputtering (refractive index 2.0) was performed on the side of the hard coat layer 45 under the conditions, a vacuum of $5\times10^{-6}$ torr, a base plate temperature of room temperature, argon of 100 scc/min, oxygen of 5 scc/min, and a deposit rate of 1.6 Å/s, to form a first refractive index layer 26 with a thickness of 25 nm.

On the first refractive index layer 26, $SiO_2$ (refractive index 1.43) was vacuum deposited under the conditions, a vacuum of $5\times10^{-6}$ torr, a base plate temperature of room temperature, and a deposit rate of 2 Å/s, to form a second refractive index layer 27 with a thickness of 20 nm.

Further, ITO sputtering was performed on the side of the second refractive index layer 27 under the conditions, a vacuum of $5\times10^{-6}$ torr, a base plate temperature of room temperature, argon of 100 scc/min, oxygen of 5 scc/min, and a deposit rate of 1.6 Å/s, to form a third refractive index layer 28 with a thickness of 120 nm.

On the third refractive index layer 28, vacuum deposition of $SiO_2$ was performed under the conditions, a vacuum of $5\times10^{-6}$ torr, a base plate temperature of room temperature, and a deposit rate of 2 Å/s, to form a fourth refractive index layer 29 with a thickness of 100 nm, thereby completing an anti-reflection film of Comparative Example 3.

EXAMPLE 4

An anti-reflection film was prepared in the same manner as in Example 1, except that the film thickness of the intermediate refractive index layer ($ZrO_2$:n=1.74)=90 nm, the film thickness of the high refractive index layer (ITO:n=2.0)=40 nm, and the film thickness of the low refractive index layer ($SiO_2$:n=1.46)=100 nm.

Comparative Example 4

Although not shown, a 7 μm thick hard coat layer 45 as used in Comparative Example 4 was provided on a PET film 5 in the same manner as in Comparative Example 4. Further, ITO and SiO2 were vacuum deposited in this order to optical film thicknesses of ($\lambda/4$–$\lambda/4$), i.e., deposited laminated film thicknesses 69 nm and 94 nm, respectively, as two refracting layers consisting of a first refracting layer and a second refracting layer. Thus, an anti-reflection film of Comparative Example 4 was prepared.

The samples obtained in the Examples and Comparative Examples were measured for the spectral drawings of anti-reflection films to investigate the low reflectivity region less than 1%. The samples were also measured for surface characteristics (surface resistance, measured by the four-terminal method; contact angle of surface, measured by Model G1, a contact angle measuring instrument of Elmer; humidity resistance test, a test for visual evaluation of a change in appearance after the sample is allowed to stand for 48 hours in an environment of 50° C. and relative humidity of 95%; and coefficient of dynamic friction).

Figure 9:
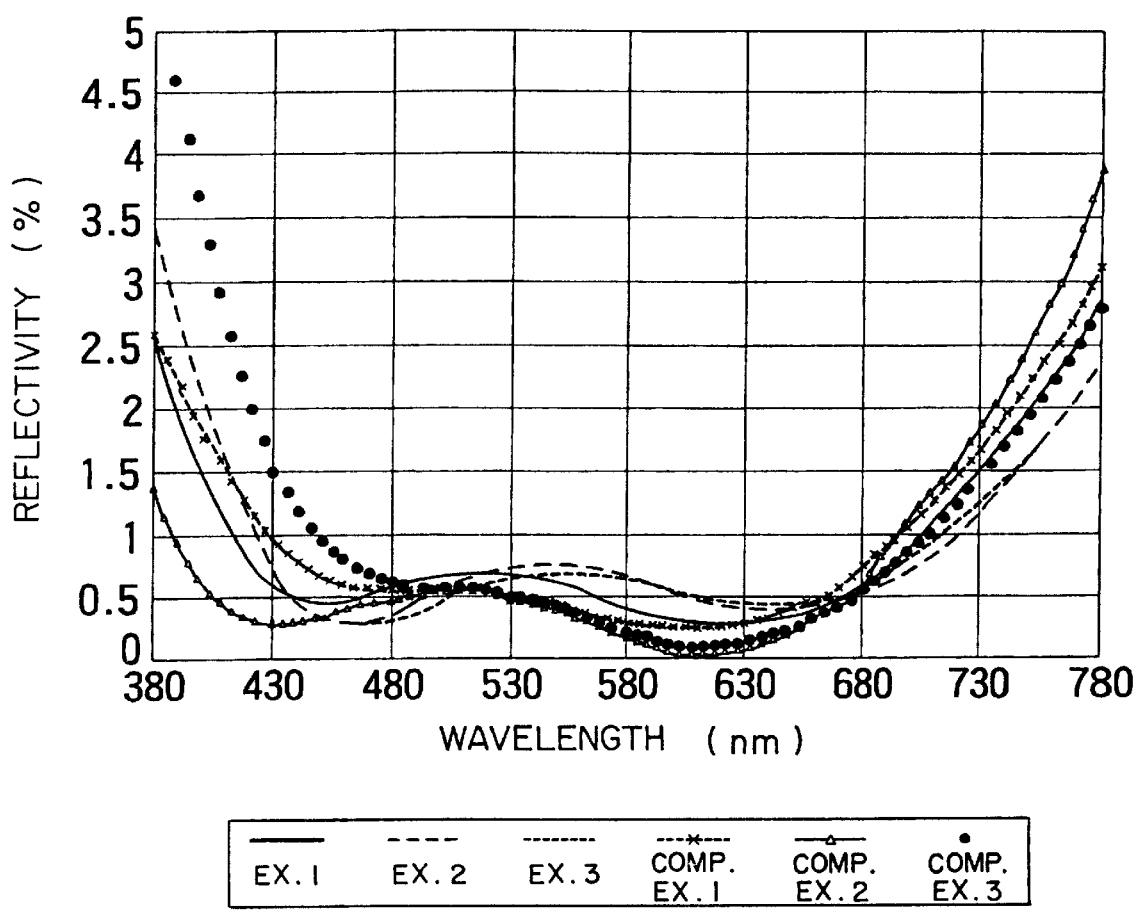
FIG. 9 is a view showing the reflectivity spectrum in the visible light region of some of the anti-reflection films of the Examples of the present invention and the Comparative Examples.

The results of measurement are shown in FIG. 9 and Table 1.

TABLE 1

| Evaluation item Sample | Low reflectivity region nm | Surface registance Ω/□ | Contact angle of surface Degrees | Coefficient of dynamic friction | Humidity resistance test | Carbon: silicon |
|---|---|---|---|---|---|---|
| Ex. 1 | 415–705 | 63 | 113 | 0.80 | No change | 0 |
| Ex. 2 | 420–720 | 65 | 112 | 0.80 | No change | 0.1 |
| Ex. 3 | 420–720 | 64 | 114 | 0.79 | No change | 0 |
| Ex. 4 | 435–700 | 122 | 112 | 0.80 | No change | 0 |
| Comp. Ex. 1 | 430–700 | 63 | 33 | 1.23 | Separated* | 0 |
| Comp. Ex. 2 | 390–700 | $10^{15}$ | 31 | 1.32 | Separated* | 0 |
| Comp. Ex. 3 | 450–710 | 66 | 30 | 1.23 | No change | 0 |
| Comp. Ex. 4 | 525–580 | 64 | 34 | 1.33 | No change | 0 |

*Separated: The optical thin layer formed by vacuum coating separated from the surface of the intermediate refractive index layer.

The anti-reflection film 10 of the present invention comprises a hard coat layer, an intermediate refractive index layer, a high refractive index layer and a low refractive index layer formed in this sequence on a base film. The hard coat layer is formed from a thermosetting or ionizing radiation curing resin. Thus, an anti-reflection film with firm, stable adhesion of the layers to the base film and having excellent anti-glare properties can be provided.

Furthermore, the refracting layers of the anti-reflection films of Examples 1 and 2 are composed of three layers. Nevertheless, these anti-reflection films give an anti-reflection effect comparable to that of the four-layer product of Comparative Example 2, and they are advantageous in that the number of steps can be decreased compared with the four-layer product.

What is claimed is:

1. An anti-reflection film having an intermediate refractive index layer, a high refractive index layer and a low refractive index layer formed in this order on a transparent base film through a hard coat layer, said anti-reflection film comprising:

the low refractive index layer comprising an $SiO_x$ layer where x is 1.5 to 4.0;

the intermediate refractive index layer comprising a coating of a composition comprising a binder and ultrafine particles having a refractive index of 1.5 or more; and the high refractive index layer; and said anti-reflection film having:

the relationship 2.20>refractive index of the high refractive index layer>refractive index of the intermediate refractive index layer>refractive index of the low refractive index layer>1.40;

the thickness of each refractive index layer being 80 to 110 nm for the low refractive index layer, 30 to 110 nm for the high refractive index layer, and 50 to 100 nm for the intermediate refractive index layer; and an optical film thickness D not larger than the wavelength of visible light (D=n·d wherein n is the refractive index of the intermediate refractive index layer and d is the thickness of the intermediate refractive index layer).

2. An anti-reflection film as claimed in claim 1, wherein the hard coat layer has irregularities on its surface in contact with the intermediate refractive index layer.

3. An anti-reflection film as claimed in claim 1, wherein the hard coat layer is provided on the transparent base film directly or through a primer layer and/or an adhesive layer.

4. An anti-reflection film as claimed in claim 1, wherein the intermediate refractive index layer comprises 1 part by weight of a thermosetting resin and/or an ionizing radiation curing resin and 0.1 to 20 parts by weight of ultrafine particles of one or more kinds selected from the group consisting of ultra-fine particles of ZnO, $TiO_2$, $CeO_2$, $Sb_2O_5$, $SnO_2$, ITO, $Y_2O_3$, $La_2O_3$, $Al_2O_3$, $Hf_2O_3$ and $ZrO_2$.

5. An anti-reflection film as claimed in claim 1, wherein the high refractive index layer and the low refractive index layer are each a layer provided by vacuum coating.

6. An anti-reflection film as claimed in claim 1, wherein the low refractive index layer is formed by plasma CVD involving the discharge of the starting gas of an organosiloxane, and the undecomposed organosiloxane remains in an amount of 0.1 to 0.2 parts of carbon based on one part of silicon.

7. An anti-reflection film as claimed in claim 1, wherein an antifouling layer may be formed on the low refractive index layer.

8. An anti-reflection film having an intermediate refractive index layer, a high refractive index layer and a low refractive index layer formed in this order on a transparent base film through a hard coat layer, said anti-reflection film comprising:

the low refractive index layer comprising an $SiO_x$ layer where x is 1.5 to 4.0;

the intermediate refractive index layer constituted by coating a paint comprising a binder and ultrafine particles having a refractive index of 1.5 or more; and the high refractive index layer having electric conductivity; and said anti-reflection film having:

the relationship 2.20>refractive index of the high refractive index layer>refractive index of the intermediate refractive index layer>refractive index of the low refractive index layer>1.40; and the ultrafine particles of the intermediate refractive index layer comprising $ZrO_2$ particles.

9. An anti-reflection film as claimed in claim 1, wherein the high refractive index layer has electric conductivity.

* * * * *